US009396541B2

(12) United States Patent
Lai

(10) Patent No.: US 9,396,541 B2
(45) Date of Patent: Jul. 19, 2016

(54) POSITIONING CONTROL METHOD

(71) Applicant: INSTITUTE FOR INFORMATION INDUSTRY, Taipei (TW)

(72) Inventor: Ching-Hao Lai, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 180 days.

(21) Appl. No.: 14/190,056

(22) Filed: Feb. 25, 2014

(65) Prior Publication Data

US 2015/0149084 A1  May 28, 2015

(30) Foreign Application Priority Data

Nov. 26, 2013 (TW) .............................. 102143061 A

(51) Int. Cl.
| | | |
|---|---|---|
| G01C 21/34 | (2006.01) | |
| G06T 7/20 | (2006.01) | |
| G06T 7/00 | (2006.01) | |
| G01C 21/36 | (2006.01) | |
| G01S 19/48 | (2010.01) | |

(52) U.S. Cl.
CPC .......... *G06T 7/0044* (2013.01); *G01C 21/3679* (2013.01); *G01S 19/48* (2013.01); *G06T 2207/10016* (2013.01); *G06T 2207/30252* (2013.01)

(58) Field of Classification Search
CPC  G01C 21/3476; G01C 21/3679; G01S 19/13; G01S 19/49; G01S 19/51; G01S 19/235; G06T 7/204; G06T 7/0044; G06T 2207/10016; G06T 2207/30241; G06T 2207/30252
See application file for complete search history.

(56) References Cited

U.S. PATENT DOCUMENTS

| | | | | |
|---|---|---|---|---|
| 8,509,488 | B1* | 8/2013 | Enge | G01C 21/3623 382/106 |
| 8,630,806 | B1* | 1/2014 | Zhu | B60W 30/16 701/408 |
| 2010/0103040 | A1* | 4/2010 | Broadbent | G01S 19/48 342/357.28 |
| 2010/0176987 | A1* | 7/2010 | Hoshizaki | G01S 19/48 342/357.23 |
| 2012/0163656 | A1 | 6/2012 | Wang et al. | |
| 2012/0176491 | A1 | 7/2012 | Garin et al. | |
| 2013/0044025 | A1* | 2/2013 | Chiu | G01S 19/42 342/357.25 |
| 2013/0238234 | A1* | 9/2013 | Chao | G01C 21/206 701/409 |

OTHER PUBLICATIONS

The examination report of the corresponding Taiwan application No. TW102143061 issued on Sep. 11, 2015.

* cited by examiner

*Primary Examiner* — Thomas G Black
*Assistant Examiner* — Ce Li
(74) *Attorney, Agent, or Firm* — CKC & PARTNERS CO., LTD.

(57) ABSTRACT

A positioning control method, suitable for an electronic device moving along with a vehicle, is provided in this disclosure. The electronic device includes an image-capturing module and a satellite-based positioning module. The positioning control method includes steps of: capturing a first image; extracting an icon object from the first image; capturing a second image; identifying the corresponding icon object in the second image; calculating a separation distance between the electronic device and the icon object according to a variance of the icon object between the first and the second images and a displacement distance of the vehicle; searching a point-of-interest (POI) corresponding to the icon object from a POI database; and, calculating/calibrating positioning data of the electronic device according to the separation distance and known coordinates of the POI.

8 Claims, 6 Drawing Sheets

POSITIONING CONTROL METHOD

RELATED APPLICATIONS

This application claims priority to Taiwan Patent Application Serial Number 102143061, filed Nov. 26, 2013, which is herein incorporated by reference.

FIELD OF INVENTION

The invention relates to a positioning method. More particularly, the invention relates to a method of calculating or calibrating a positioning position according to a real-time captured image.

BACKGROUND

Most positioning devices (or navigation devices) utilizes technologies of Global Position System (GPS). GPS is a combination of wireless communication technology and satellite technology for providing accurate positioning, velocity and time information to users. With advances in satellite-related technologies, applications of GPS have been gradually spreads from military usage to our daily life. The most common application of GPS includes positioning a target item and navigation.

Positioning and navigation functions of the GPS rely on mutual cooperation between satellites, positioning devices and navigation software. However, the positioning device occasionally fails to receive any positioning signal sent from the satellites because the positioning signals might be obscured by buildings in some cases. For example, when user is located inside a building (e.g., airport terminal, skyscraper, underpass or tunnel) or surrounded by tall buildings in a metropolitan area, the positioning device carried by the user fails to receive any satellite signal, such that the positioning function of the positioning device will be failed. In this case, if the positioning function is needed, users must move the positioning device to outdoor area or open space in order to receive the satellite signals, and it is inconvenient to users.

In addition, the positioning device located in the metropolitan area usually encounters an issue of multi-path effect, which means the satellite signals are reflected by buildings, mirrors, water surfaces or other reflective surfaces to antenna of the positioning device. The satellite signals reflected through different paths will disrupt judgments of the positioning device and cause positioning errors.

SUMMARY

An aspect of the disclosure is to provide a positioning control method, which is suitable for an electronic device mounted on a moving vehicle. The electronic device includes an image-capturing module and a satellite-based positioning module. The positioning control method includes steps of: capturing a first image; extracting an icon object from the first image; capturing a second image; identifying the corresponding icon object in the second image; calculating a separation distance between the electronic device and the icon object according to a variance of the icon object between the first and the second images and a displacement distance of the moving vehicle; searching a point-of-interest (POI) site corresponding to the icon object from a point-of-interest database; and, calculating or calibrating positioning data of the electronic device according to the separation distance and known coordinates of the point-of-interest site.

According to an embodiment, the step of searching the point-of-interest site further includes: obtaining first positioning coordinates of the electronic device by the satellite-based positioning module; and, searching the point-of-interest database according to the icon object within a neighborhood area of the first positioning coordinates, so as to obtain the point-of-interest site.

According to an embodiment, the step of calculating or calibrating the positioning data of the electronic device further includes: calculating second positioning coordinates of the electronic device according to the separation distance and the known coordinates of the point-of-interest site; and, when the first positioning coordinates and the second positioning coordinates are mismatched, performing a weighted-statistical calculation on the first positioning coordinates obtained from the satellite-based positioning module and the second positioning coordinates, so as to calibrate the positioning data of the electronic device.

According to an embodiment, when the first positioning coordinates and the second positioning coordinates are mismatched, the positioning control method further includes: calculating site coordinates of the icon object according to the separation distance and the first positioning coordinates; reporting the site coordinates after calculation to the point-of-interest database; and, performing a weighted-statistical calculation on the known coordinates of the point-of-interest site and the site coordinates after calculation, so as to update the known coordinates stored in the point-of-interest database.

According to an embodiment, the moving vehicle comprises an on-board diagnostic (OBD) system or an electronic control unit (ECU). The positioning control method further includes: during a time interval between that the first image and the second image are captured, reading a moving speed of the moving vehicle from the on-board diagnostic system or the electronic control unit; and, calculating the displacement distance according to the moving speed and the time interval.

According to an embodiment, the positioning control method further includes: obtaining two sets of positioning coordinates when the first image is captured and the second image is captured; and, estimating the displacement distance according to a difference between these two sets of positioning coordinates.

According to an embodiment, when there is nothing in the point-of-interest database matching the point-of-interest site corresponding to the icon object, the positioning control method further includes: obtaining third positioning coordinates of the electronic device by the satellite-based positioning module; calculating site coordinates of the icon object according to the separation distance and the third positioning coordinates; performing an image recognition to obtain icon content information from the icon object, and establishing a new point-of-interest site with reference to the site coordinates; and, updating the new point-of-interest site to the point-of-interest database.

According to an embodiment, the icon object corresponds to a shop sign, an advertising sign, a road-name indication board or a traffic sign. The icon content information includes an icon name, an icon type, an icon ancillary facility, or an icon thumbnail image.

According to an embodiment, when the point-of-interest site corresponding to the icon object is existed in the point-of-interest database, the positioning control method further includes performing an image recognition to obtain icon content information from the icon object, and updating the icon content information to the point-of-interest site stored within the point-of-interest database.

According to an embodiment, the electronic device suitable for adopting the positioning control method is a mobile communication device, a tablet computer, a driving navigator, a driving recorder or a vehicle telematics computer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
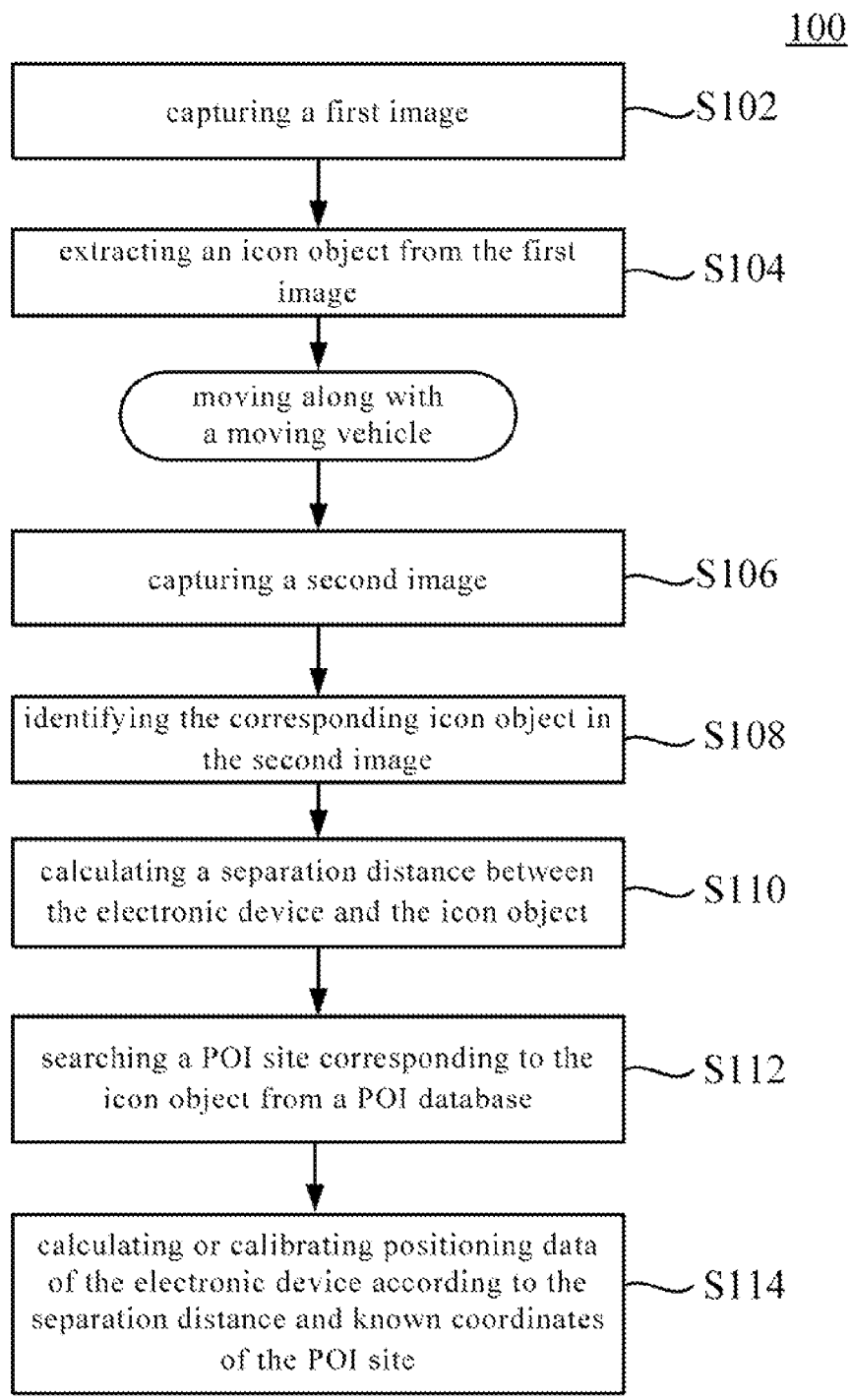
FIG. 1 is a flow-chart diagram illustrating a positioning control method according to an embodiment of the disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 2:
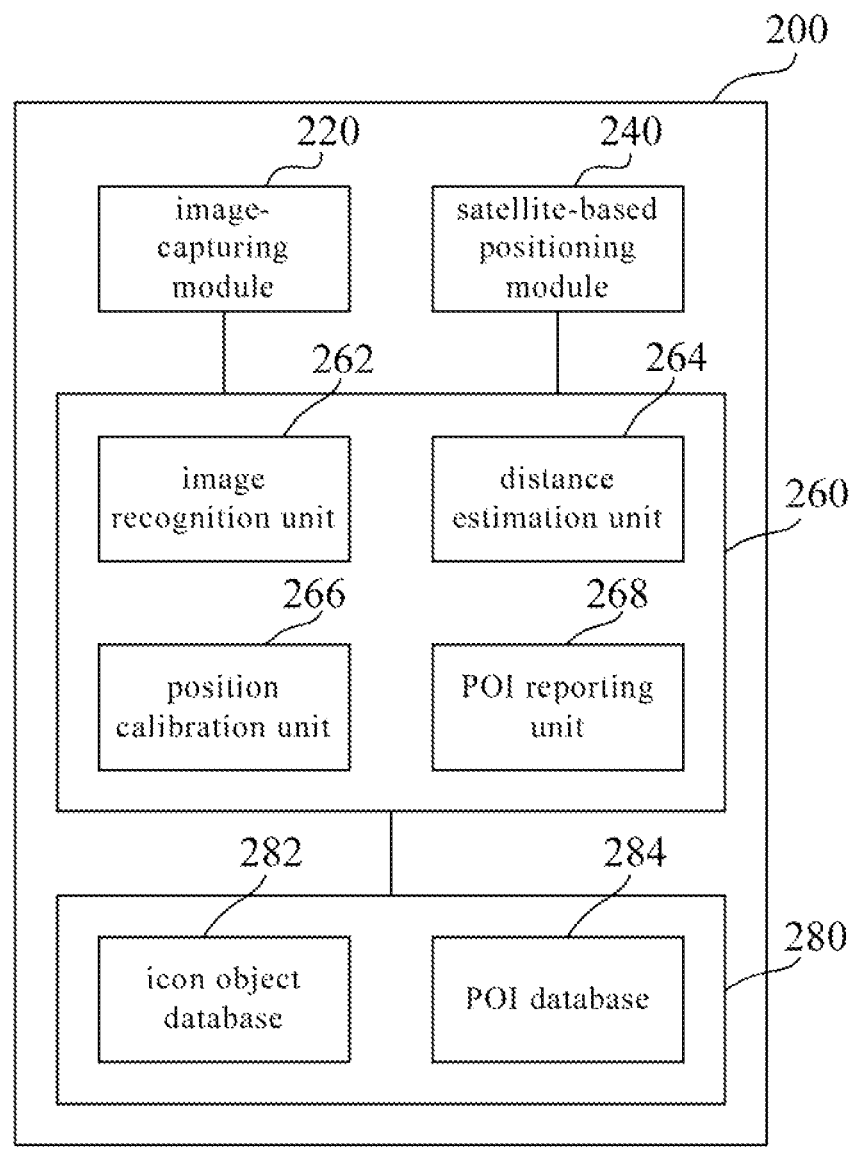
FIG. 2 is a functional-block diagram illustrating an electronic device according to an embodiment of the disclosure.
Figure 3:
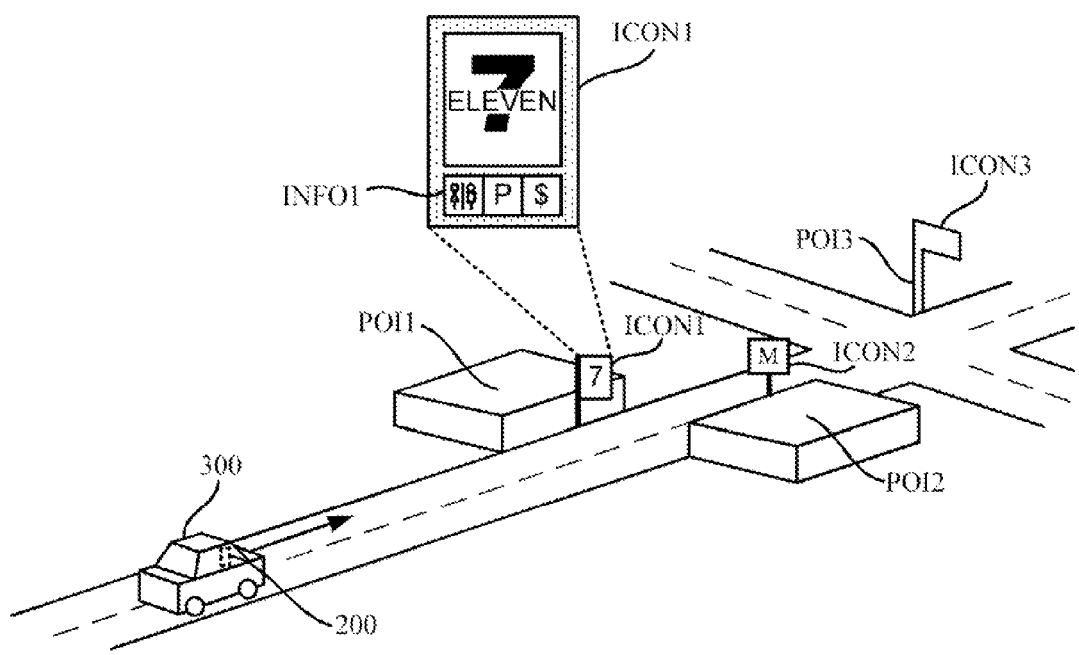
FIG. 3 is a schematic diagram illustrating that a moving vehicle equipped with the electronic device moves along a road in an urban area according to an exemplary embodiment in the disclosure.

Reference is made to FIG. 1, FIG. 2 and FIG. 3. FIG. 1 is a flow-chart diagram illustrating a positioning control method 100 according to an embodiment of the disclosure. The positioning control method 100 is suitable for an electronic device mounted on a moving vehicle (e.g., personal vehicle, bicycle, bus, train or other transportation vehicles). FIG. 2 is a functional-block diagram illustrating an electronic device 200 according to an embodiment of the disclosure. FIG. 3 is a schematic diagram illustrating that a moving vehicle 300 equipped with the electronic device 200 moves along a road in an urban area according to an exemplary embodiment in the disclosure.

The electronic device 200 can be any type of electronic devices with functions of satellite-based positioning and image-capturing. In practices, the electronic device 200 can be a mobile communication device (e.g., a smart phone with a navigation function), a tablet, a driving navigator, a driving recorder or a vehicle telematics computer.

Recently, in addition to basic functions such as positioning, address-searching and basic map services, the device (i.e., the electronic device 200) with the satellite-based positioning function further provides the function of searching relation information about shops, traffic signs, parking lots, gas stations and/or popular attractions. For example, a point-of-interest (POI) database corresponding to the mobile communication device or the driving navigator is utilized to store all information about sites (e.g., specific spots, places, shops, etc) of interest and the corresponding coordinates thereof.

As shown in FIG. 2, the electronic apparatus 200 in the embodiment includes an image-capturing module 220, a satellite-based positioning module 240, a control module 260 and a memory module 280. The control module 260 includes an image recognition unit 262, a distance estimation unit 264, a position calibration unit 266 and a POI reporting unit 268. Each of aforesaid units can be formed by specific hardware circuits or specific software procedures. The memory module 280 includes an icon object database 282 and a POI database 284 built in the electronic device 200.

In addition to the POI database 284 built in the electronic device 200, the electronic device 200 in the embodiment can communicatively connects to an on-line POI database maintained by navigation software vendors, map-information vendors or other users. In another embodiment, the electronic device 200 connects to access an external POI database through a communicative connection without including the built-in POI database 284.

As shown in FIG. 3, the positioning control method 100 of the disclosure captures multiple images dynamically (e.g., periodically capturing one image by every 1 second, 3 seconds, 5 seconds, etc) while the electronic device 200 moving with the moving vehicle 200. Positioning information of the electronic device (and the moving vehicle as well) can be calibrated according to a relative variance of a specific icon object within the multiple images, and details of the positioning control method 100 is disclosed in following paragraphs.

As shown in FIG. 1, FIG. 2 and FIG. 3, the positioning control method 100 executes step S102 for capturing the first image by the image-capturing module 220. Afterward, step S104 is executed for extracting an icon object from the first image. In the example shown in FIG. 3, icon objects ICON1 (e.g., a sign of 7-11 convenient store), ICON2 (e.g., a sign of MacDonald restaurant) and ICON3 (e.g., a road-name indication board) are captured in view of the first image, but the disclosure is not limited to the icon objects illustrated in FIG. 3. In the embodiment, the icon objects can correspond to all kinds of shop signs (e.g., Hi-Life, OK, Watsons, KFC, etc) advertising signs, road-name indication boards or traffic signs (e.g., traffic lights, one-way indicators, street lights). In following paragraphs, the icon object ICON1 (e.g., the sign of 7-11 convenient store) is utilized substantially for exemplary demonstrations.

The icon objects ICON1, ICON2 and ICON3 can correspond to different POI site. For example, the icon objects ICON1 can be the City-Hall branch of 7-11 convenient stores; the icon objects ICON2 can be the City-Hall branch of MacDonald restaurants; and the icon objects ICON3 can be a road-name indication board corresponding to an intersection in front of the City-Hall.

A specific time period (e.g., three seconds) after, the moving vehicle 300 moves a specific distance and the positioning control method 100 executes step S106 for capturing a second image by the image-capturing module 220. Then, step S108 is executed for identifying the corresponding icon object ICON1 in the second image.

While the moving vehicle 300 moving forward, the moving vehicle 300 is getting closer to the practical position of the POI site POI 1. In this case, the size of the icon object ICON1 within the second image will change correspondingly. Under the same configuration of focal distance of the image-capturing module 220 of the electronic device 200, the icon object ICON1 will be enlarged gradually while the moving vehicle 300 getting closer to the POI site POI1.

The positioning control method 100 executes step S110 for calculating a separation distance between the electronic device 200 and the icon object ICON1 (and the corresponding POI site POI1) according to a variance of the icon object ICON1 between the first and the second images and a displacement distance of the moving vehicle 300.

Figure 4:
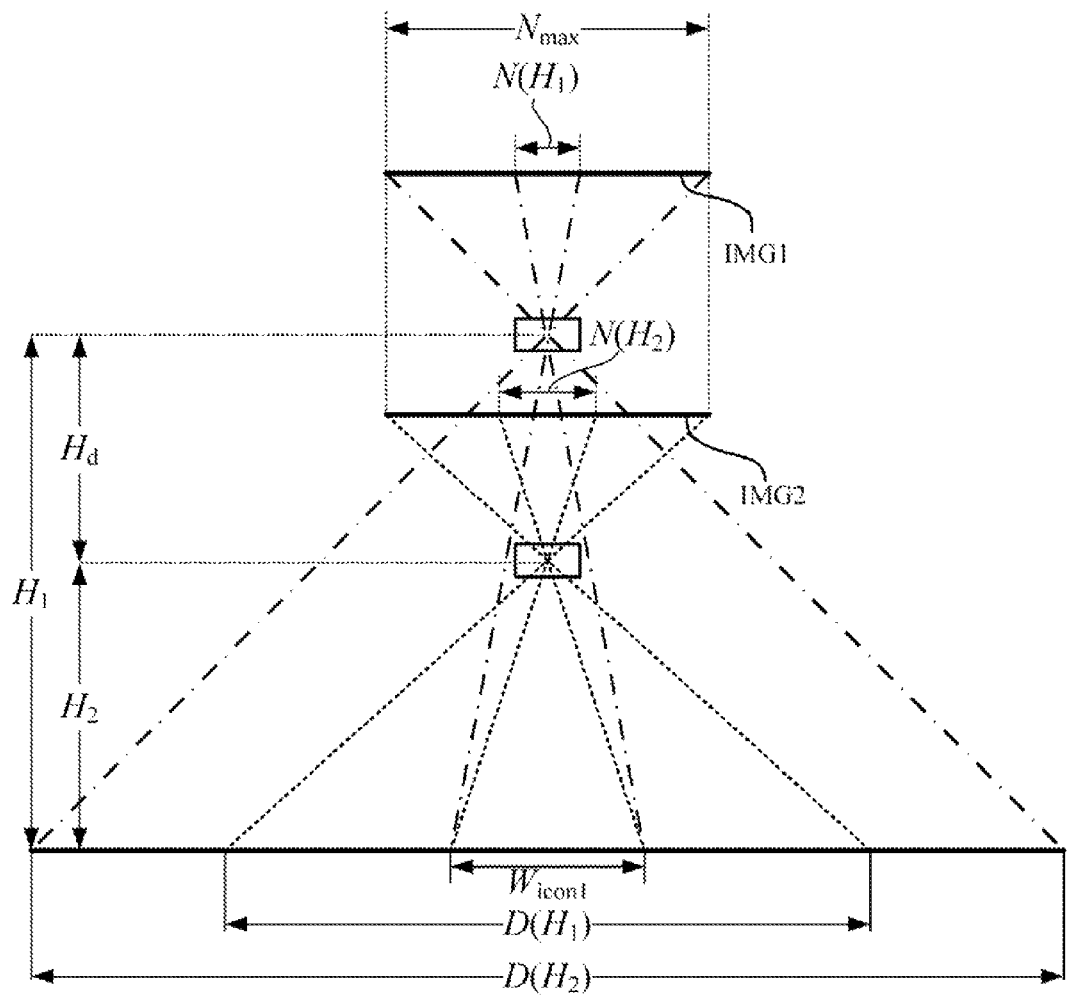
FIG. 4 is a schematic diagram illustrating a relationship between the variance of the icon object between the first/second images and the separation distance between the electronic device and the icon object.

Reference is made to FIG. 4, which is a schematic diagram illustrating a relationship between the variance of the icon object ICON1 between the first/second images IMG1/IMG2 and the separation distance between the electronic device 200 and the icon object ICON1.

As shown in FIG. 4, the first image IMG1 and the second image IMG2 represent two images captured in sequence by the image-capturing module 220. A separation distance between the electronic device 200 and the icon object ICON1, when the first image IMG1 is captured, is represented as the separation distance $H_1$; a separation distance between the electronic device 200 and the icon object ICON1, when the second image IMG2 is captured, is represented as the separation distance $H_2$; a maximal image width (or height) of the first image IMG1 and the second image IMG2 is represented as the maximal image width $N_{max}$; a width (or height) of the icon object ICON1 is represented as the icon width $W_{icon1}$; a size of the icon object ICON1 shown within the first image IMG1 is represented as the icon image width $N(H_1)$; a size of the icon object ICON1 shown within the second image IMG2 is represented as the icon image width $N(H_2)$; a displacement distance of the moving vehicle 300 is represented as the displacement distance $H_d$.

When the image-capturing module 220 maintains the same configuration of focal distance, the icon image width N(H1) of the first image IMG1 and the icon image width N(H1) of the second image IMG2 will have a relationship as follows:

$$\frac{W_{icon1}}{N(H_1)} = \frac{D(H_1)}{N_{max}} \quad (1)$$

and $$\frac{W_{icon1}}{N(H_2)} = \frac{D(H_2)}{N_{max}}$$

$$\Rightarrow \frac{N(H_2)}{N(H_1)} = \frac{D(H_1)}{D(H_2)} = \frac{H_1}{H_2}$$

In aforesaid equation, only the separation distance $H_1$ and the separation distance $H_2$ are unknown variables, and the displacement distance $H_d$ is the difference between them (i.e., $H_d = H_1 - H_2$). On the other hand, $H_d$, $N(H_1)$ and $N(H_2)$ are all known variables. The equation (1) can be deducted into:

$$H_2 = \frac{N(H_1)}{N(H_2) - N(H_1)} \times H_d \quad (2)$$

As shown in aforesaid equation (2), the separation distance $H_2$ between the electronic device 200 and the icon object ICON1 can be calculated in accordance to the variance of the icon object ICON1 within the first image IMG1 and the second image $$IMG2 \left(\text{i.e., } \frac{N(H_1)}{N(H_2) - N(H_1)}\right)$$

and the displacement distance $H_d$.

In an embodiment, the moving vehicle 300 includes an on-board diagnostic (OBD) system or an electronic control unit (ECU). During a time interval between that the first image IMG1 and the second image IMG2 are captured, the positioning control method 100 reading a moving speed of the moving vehicle from the OBD system or the ECU, such that the displacement distance $H_d$ can be calculation by a product of the moving speed and the time interval.

In another embodiment, the positioning control method 100 obtains two sets of positioning coordinates when the first image IMG1 and the second image IMG2 are captured, and the positioning control method 100 estimates the displacement distance $H_d$ according to a difference between these two sets of positioning coordinates. However, the positioning control method 100 is not limited to calculate the displacement distance $H_d$ by aforesaid manners.

Therefore, the distance estimation unit 264 can calculate the separation distance between the electronic device 200 and the icon object ICON1 in reference to the variance of the icon object ICON1 within the first image IMG1 and the second image IMG2 when the displacement distance $H_d$ is known.

Afterward, as shown in FIG. 1, FIG. 2 and FIG. 3, the positioning control method 100 executes step S112 for searching a POI site corresponding to the icon object ICON1 from a POI database (can be the built-in POI database 284 of the electronic device 200 or an external POI database accessible through a communicative connection).

The POI database records satellite-coordinates, names and basic information of each of shops, traffic signals, parking lots, gas stations and popular attractions. In general, the POI database has recorded known coordinates of the POI site POI1 (i.e., the City-Hall branch of 7-11 convenient stores).

Afterward, the positioning control method 100 executes step S114 for calculating or calibrating positioning data of the electronic device 200 according to the separation distance $H_2$ and known coordinates of the point-of-interest site POI1.

In aforesaid embodiment, the positioning data of the electronic device 200 is calculated or calibrated according to one icon object ICON1 within the first image IMG1 and the second image IMG2, but the disclosure is not limited thereto. In practices, the calculation or calibration can be done according to multiple icon objects ICON1, ICON2 and ICON3 within the first image IMG1 and the second image IMG2 at the same time, so as to perform calculation/calibration with better preciseness.

Based on aforesaid embodiments, the disclosure provides a method for calculating or calibrating positioning data by performing an image recognition on dynamic captured images and referring to the known coordinates within the POI database. In an urban area with many buildings, the POI sites (stores, signs, buildings and other attractions) are available for reference at high density, such that the positioning control method can provide more accurate estimation. Therefore, the positioning control method can avoid issues of bad reception of satellite positioning signals and noise impacts caused by the multi-path effect.

Figure 5:
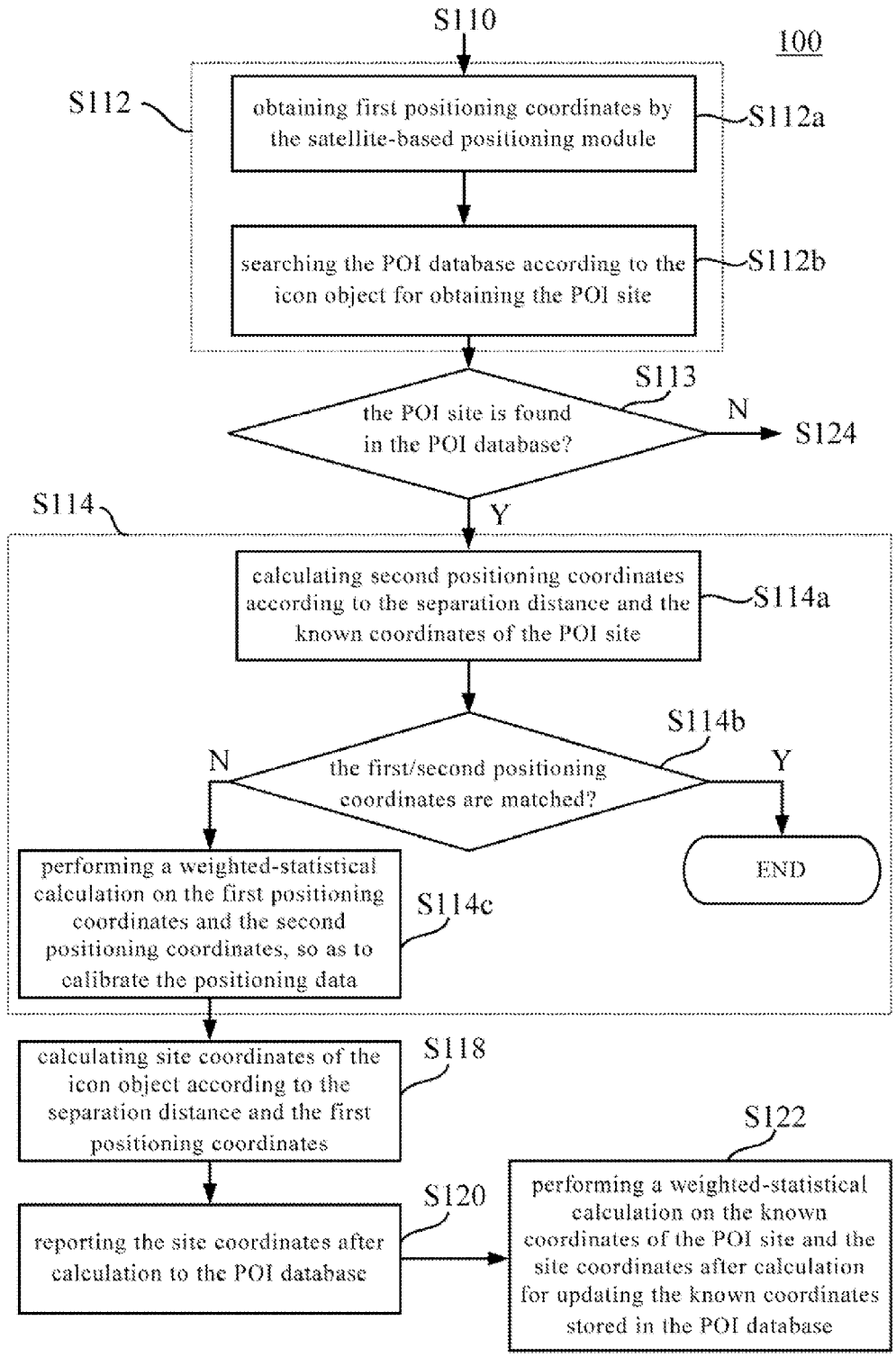
FIG. 5 is a flow-chart diagram illustrating detail steps and some further steps of the positioning control method according to an embodiment of the disclosure.
Figure 6:
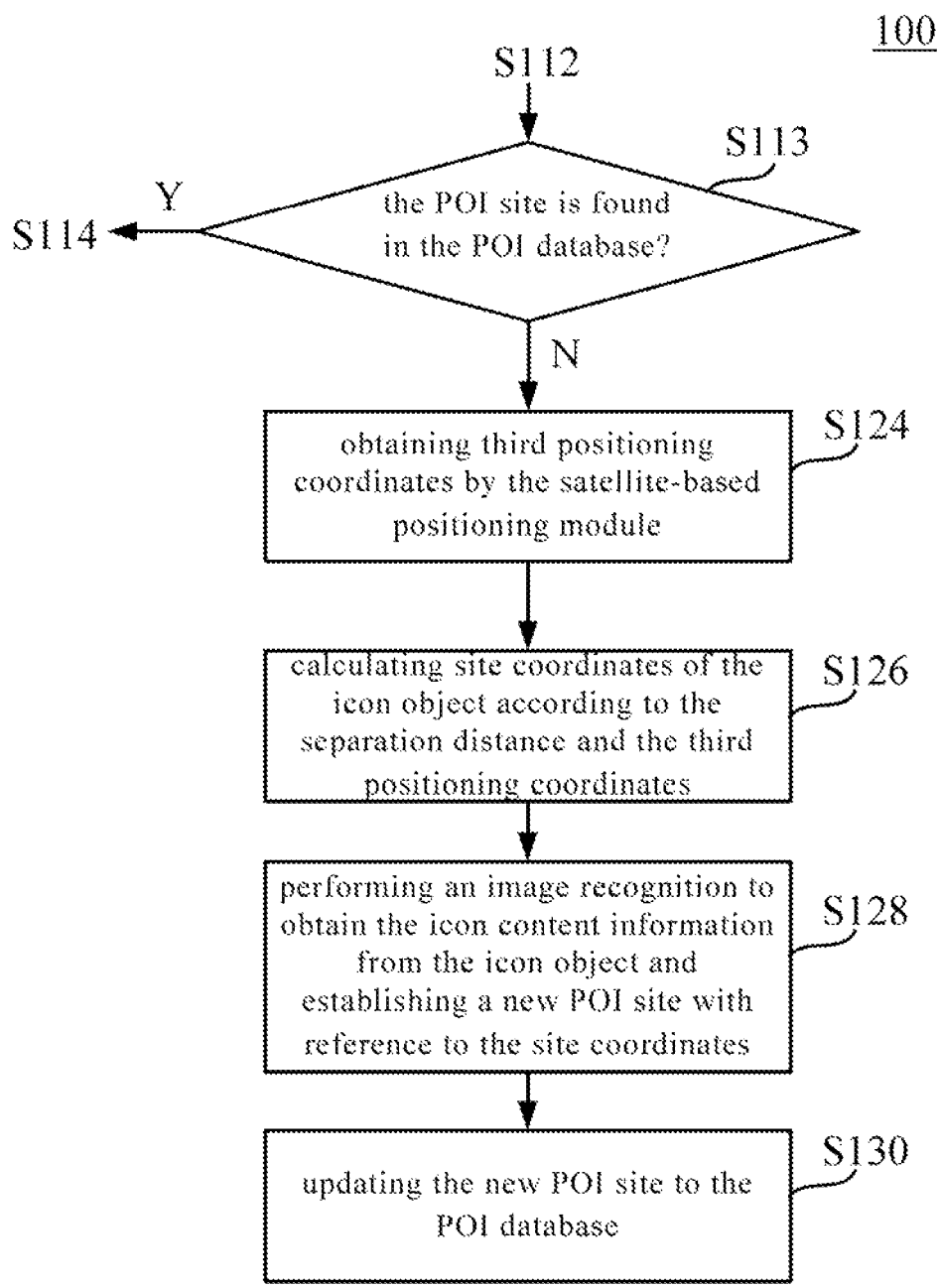
FIG. 6 is a flow-chart diagram illustrating detail steps and some further steps of the positioning control method according to an embodiment of the disclosure.

Reference is further made to FIG. 5 and FIG. 6, which are flow-chart diagrams illustrating detail steps and some further steps of the positioning control method 100 according to an embodiment of the disclosure.

As shown in FIG. 5, the step of searching the POI site POI1 (referring to step S112 in FIG. 1) further includes sub-step S112a for obtaining first positioning coordinates (served as preliminary positioning coordinates) of the electronic device 200 by the satellite-based positioning module 240. Afterward, sub-step S112b is executed for searching the POI database according to the icon object ICON1 within a neighborhood area of the first positioning coordinates (the preliminary positioning coordinates), so as to obtain the POI site POI1, such that the efficiency and accuracy while searching the POI database can be elevated.

In addition, the positioning control method 100 further includes step S113 for determining if the POI site POI1 corresponding to the icon object is found in the POI database. If the POI site POI1 has been registered in the existed data within the POI database, step S114 is triggered (including sub-steps S114a-S114c). If the POI site POI1 does not exist in the POI database, step S124 is triggered.

When the POI site POI1 has been registered in the existed data within the POI database, the positioning control method 100 executes sub-step S114a for calculating second positioning coordinates of the electronic device according to the separation distance $H_2$ and the known coordinates of the point-of-interest site POI1. Afterward, sub-step S114b is executed for determining if the first positioning coordinates match the second positioning coordinates.

When the first positioning coordinates and the second positioning coordinates are detected to be mismatched in sub-step S114b, sub-step S114c is executed for performing a weighted-statistical calculation on the first positioning coordinates obtained from the satellite-based positioning module 240 and the second positioning coordinates, so as to calibrate the positioning data of the electronic device 200. The weighted-statistical calculation is performed as follow:

$$\text{Positioning coordinates of the electronic device} = \gamma P_1 + \delta P_2 = \gamma P_1 + \delta(P_{POI} - H_d)$$

$P_1$ represents the first coordinates; $P_2$ represents the second coordinates; $P_{POI}$ represents the known coordinates of the POI site; weight variables $\gamma$ and $\delta$ represents a calibration parameter.

In addition, if the satellite-based positioning module 240 fails to receive the satellite signal and obtain the first coordinates, the positioning control method 100 directly adopt the second positioning coordinates, as follows:

$$\text{Positioning coordinates of the electronic device} = P_2 = P_{POI} - H_d$$

Furthermore, current POI sites are manually gathered by map-information vendors, and contents of the current POI sites has only a little information, such as bad location accuracy, lack of information about additional facilities provided by the POI sites (such as toilets, ATMs), newly-added facilities, newly-added attractions, real-time traffics and/or temporary events venues. In addition, the stores of POI sites may change their address from time to time. In general, data in the POI database without updating/maintenance will include many stores which are closed or moved already for a long time.

Therefore, the positioning control method further includes a mechanic of dynamically updating the POI database. As shown in FIG. 5, when the first positioning coordinates and the second positioning coordinates are mismatched, the positioning control method 100 further executes step S118 for calculating site coordinates of the icon object ICON1 according to the separation distance $H_2$ and the first positioning coordinates (obtained from the satellite-based positioning module 240). Afterward, step S120 is executed for reporting the site coordinates after calculation to the point-of-interest database. Afterward, step S122 is executed for performing a weighted-statistical calculation on the known coordinates of the POI site POI1 and the site coordinates after calculation, so as to update the known coordinates stored in the point-of-interest database.

For example, when there are many user reporting the site coordinates of the POT site POI1 has been changed recently (and different from the known coordinates), such that the POI database can update the coordinates of the POI site accordingly. In addition, the positioning control method 100 can report related icon content information, such as icon name, an icon type, an icon ancillary facility, or an icon thumbnail image. As the icon object ICON1 shown in FIG. 3 for example, the positioning control method 100 can report icon content information INFO1 about that the POI site POI1 has a toilet, parking lots and an ATM, such as to keep the data registered in the POI database in real-time and complete.

On the other hand, if there is nothing in the point-of-interest database matching the POI site POI1 (e.g., detected to be negative at step S113), the positioning control method 100 executes step S124. As shown in FIG. 6, step S124 is executed for obtaining third positioning coordinates by the satellite-based positioning module 240. Afterward, step S126 is executed for calculating site coordinates of the icon object ICON1 according to the separation distance $H_2$ and the third positioning coordinates. Afterward, step S128 is executed for performing an image recognition to obtain the icon content information from the icon object ICON1, and establishing a new POI site with reference to the site coordinates. Afterward, step S130 is executed for updating the new POI site to the point-of-interest database.

Based on aforesaid embodiments, the disclosure provides a method for calculating or calibrating positioning data by performing an image recognition on dynamic captured images and referring to the known coordinates within the POI database. In an urban area with many buildings, the POI sites (stores, signs, buildings and other attractions) are available for reference at high density, such that the positioning control method can provide more accurate estimation. In addition, the control method of the disclosure can dynamically update new status (e.g., live traffic, name change, new facility, address verification, additional information) of each POI site within the POI database, such that the map-information vendors are not required to manually update the POI database.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second." etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A positioning control method, suitable for an electronic device mounted on a moving vehicle, the electronic device comprising an image-capturing module and a satellite-based positioning module, the positioning control method comprising steps of:

capturing a first image;
extracting an icon object from the first image;
capturing a second image;
identifying the corresponding icon object in the second image;
calculating a separation distance between the electronic device and the icon object according to a variance of the icon object between the first and the second images and a displacement distance of the moving vehicle;
searching a point-of-interest (POI) site corresponding to the icon object from a point-of-interest database; and
calculating or calibrating positioning data of the electronic device according to the separation distance and known coordinates of the point-of-interest site;
wherein the step of searching the point-of-interest site further comprises:
obtaining first positioning coordinates of the electronic device by the satellite-based positioning module; and
searching the point-of-interest database according to the icon object within a neighborhood area of the first positioning coordinates, so as to obtain the point-of-interest site;
wherein the step of calculating or calibrating the positioning data of the electronic device further comprises:
calculating second positioning coordinates of the electronic device according to the separation distance and the known coordinates of the point-of-interest site; and
when the first positioning coordinates and the second positioning coordinates are mismatched, calibrating the positioning data of the electronic device according to the first positioning coordinates obtained from the satellite-based positioning module and the second positioning coordinates;
wherein, when the first positioning coordinates and the second positioning coordinates are mismatched, the positioning control method further comprises:
calculating site coordinates of the icon object according to the separation distance and the first positioning coordinates;
reporting the site coordinates after calculation to the point-of-interest database; and
updating the known coordinates stored in the point-of-interest database according to the known coordinates of the point-of-interest site and the site coordinates after calculation.

2. The positioning control method of claim 1, wherein the moving vehicle comprises an on-board diagnostic (OBD) system or an electronic control unit (ECU), the positioning control method further comprises:

during a time interval between that the first image and the second image are captured, reading a moving speed of the moving vehicle from the on-board diagnostic system or the electronic control unit; and
calculating the displacement distance according to the moving speed and the time interval.

3. The positioning control method of claim 1, wherein the positioning control method further comprises obtaining two sets of positioning coordinates when the first image is captured and the second image is captured, and estimating the displacement distance according to a difference between these two sets of positioning coordinates.

4. A positioning control method, suitable for an electronic device mounted on a moving vehicle, the electronic device comprising an image-capturing module and a satellite-based positioning module, the positioning control method comprising steps of:

capturing a first image;
extracting an icon object from the first image;
capturing a second image;
identifying the corresponding icon object in the second image;
calculating a separation distance between the electronic device and the icon object according to a variance of the icon object between the first and the second images and a displacement distance of the moving vehicle;
searching a point-of-interest (POI) site corresponding to the icon object from a point-of-interest database; and
calculating or calibrating positioning data of the electronic device according to the separation distance and known coordinates of the point-of-interest site;
wherein the step of searching the point-of-interest site further comprises:
obtaining first positioning coordinates of the electronic device by the satellite-based positioning module; and
searching the point-of-interest database according to the icon object within a neighborhood area of the first positioning coordinates, so as to obtain the point-of-interest site;
wherein, when there is nothing in the point-of-interest database matching the point-of-interest site corresponding to the icon object, the positioning control method further comprises:
obtaining third positioning coordinates of the electronic device by the satellite-based positioning module;
calculating site coordinates of the icon object according to the separation distance and the third positioning coordinates;
performing an image recognition to obtain icon content information from the icon object, and establishing a new point-of-interest site with reference to the site coordinates; and
updating the new point-of-interest site to the point-of-interest database.

5. The positioning control method of claim 4, wherein the icon object corresponds to a shop sign, an advertising sign, a road-name indication board or a traffic sign, the icon content information comprises an icon name, an icon type, an icon ancillary facility, or an icon thumbnail image.

6. The positioning control method of claim 4, wherein, when the point-of-interest site corresponding to the icon object is existed in the point-of-interest database, the positioning control method further comprises performing the image recognition to obtain icon content information from the icon object, and updating the icon content information to the point-of-interest site stored within the point-of-interest database.

7. The positioning control method of claim 4, wherein the icon object corresponds to a shop sign, an advertising sign, a road-name indication board or a traffic sign, the icon content information comprises an icon name, an icon type, an icon ancillary facility, or an icon thumbnail image.

8. The positioning control method of claim 4, wherein the electronic device suitable for adopting the positioning control method is a mobile communication device, a tablet computer, a driving navigator, a driving recorder or a vehicle telematics computer.

* * * * *